(12) United States Patent
Fattal

(10) Patent No.: US 9,257,914 B2
(45) Date of Patent: Feb. 9, 2016

(54) ACTIVE RECTIFICATION CONTROL

(71) Applicant: HAMILTON SUNDSTRAND CORPORATION, Windsor Locks, CT (US)

(72) Inventor: Souren G. Fattal, Palatine, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 16 days.

(21) Appl. No.: 14/331,877

(22) Filed: Jul. 15, 2014

(65) Prior Publication Data

US 2014/0328100 A1 Nov. 6, 2014

Related U.S. Application Data

(62) Division of application No. 12/961,364, filed on Dec. 6, 2010, now Pat. No. 8,804,388.

(51) Int. Cl.
*H02M 1/42* (2007.01)
*H02M 7/06* (2006.01)
*H02M 7/219* (2006.01)

(52) U.S. Cl.
CPC .............. *H02M 7/06* (2013.01); *H02M 1/4216* (2013.01); *Y02B 70/126* (2013.01)

(58) Field of Classification Search
CPC ....... Y02B 70/12; Y02B 70/126; H02M 1/42; H02M 1/4208; H02M 1/4216; H02M 1/4225; H02M 1/4233; H02M 7/219; G05F 1/70
USPC ................. 363/39, 44, 84, 89, 125, 126, 127; 323/205, 207
See application file for complete search history.

(56) References Cited

U.S. PATENT DOCUMENTS

| | | | |
|---|---|---|---|
| 4,030,016 A | 6/1977 | Marriott | |
| 6,198,613 B1 | 3/2001 | Rozman | |
| 6,421,262 B1 | 7/2002 | Saxelby et al. | |
| 6,545,887 B2 | 4/2003 | Smedley et al. | |
| 6,757,185 B2 * | 6/2004 | Rojas Romero | .... H02M 1/4216 363/89 |
| 7,269,039 B2 | 9/2007 | Cheng | |
| 7,355,865 B2 * | 4/2008 | Royak | ...................... H02M 1/12 363/44 |
| 7,400,065 B2 | 7/2008 | Michalko | |
| 7,403,404 B2 * | 7/2008 | Oka | ..................... H02P 21/0035 318/802 |
| 7,450,405 B2 | 11/2008 | Ponnaluri et al. | |
| 7,492,616 B2 | 2/2009 | Fu et al. | |
| 7,615,881 B2 | 11/2009 | Halsey et al. | |
| 7,746,024 B2 | 6/2010 | Rozman et al. | |
| 7,751,211 B2 * | 7/2010 | Yuzurihara | ........... H02M 7/125 363/127 |
| 7,986,538 B2 | 7/2011 | Harke | |
| 2003/0218887 A1 * | 11/2003 | Kojori | ................. H02P 23/0036 363/16 |
| 2006/0151874 A1 | 7/2006 | Milich et al. | |
| 2007/0014374 A1 | 1/2007 | Hershbarger | |

(Continued)

OTHER PUBLICATIONS

EP Search Report for Application No. 11191230.9, mailed Feb. 6, 2015, 12 pages.

(Continued)

*Primary Examiner* — Gary L Laxton
(74) *Attorney, Agent, or Firm* — Cantor Colburn LLP

(57) ABSTRACT

A method of active rectification control of an active rectifier includes detecting a phase angle and a frequency of a voltage input of the active rectifier; regulating a DC output voltage of the active rectifier with d-q components of a pole voltage; and aligning a reference current input of the active rectifier to the d-q components of the pole voltage.

11 Claims, 6 Drawing Sheets

(56) References Cited

U.S. PATENT DOCUMENTS

| | | |
|---|---|---|
| 2007/0109824 A1 | 5/2007 | Romenesko |
| 2008/0012252 A1 | 1/2008 | Hernandez |
| 2009/0244937 A1 | 10/2009 | Liu |
| 2011/0134669 A1 | 6/2011 | Yuzurihara et al. |

OTHER PUBLICATIONS

Rixin Lai et al: "Average Modeling and Control Design for VIENNA-Type Rectifiers Considering the DC-Link Voltage Balance", IEEE Transactions on Power Electronics, Institute of Electrical and Electronics Engineers, USA, vol. 24, No. 11, Nov. 1, 2009, pp. 2509-2522.

Viitanen T et al: "The operation of the vector modulated and vector controlled VIENNA I rectifier under distorted and unbalanced mains voltages", Applied Power Electronics Conference and Exposition, 2005. APEC 2005. Twentieth Annuel IEEE Austin, TX, USA Mar. 6-10, 2005, Piscataway, NJ, USA, IEEE, US, vol. 3, Mar. 6, 2005, pp. 1680-1686.

Wang B et al: "Unity Power Factor Control for Three-Phase Three-Level Rectifiers Without Current Sensors", IEEE Transactions on Industry Applications, IEEE Service Center, Piscataway, NJ, US, vol. 43, No. 5, Sep. 1, 2007, pp. 1341-1348.

Zeng Kefeng et al: "Time domain characterization of oscillating sensors: Application of frequency counting to resonance frequency determination", Review of Scientific Instruments, AIP, Melville, NY, US, vol. 73, No. 12, Dec. 1, 2002, pp. 4375-4380.

* cited by examiner

ACTIVE RECTIFICATION CONTROL

CROSS-REFERENCE TO RELATED APPLICATIONS

This application is a divisional application of application Ser. No. 12/961,364, filed Dec. 6, 2010, the entire contents of which is herein incorporated by reference.

FIELD OF INVENTION

The subject matter disclosed herein relates generally to the field of active rectification, and more particularly to control of active rectifiers.

DESCRIPTION OF RELATED ART

In aircraft, weight restrictions play important roles in the design and operation of power systems. In active rectification for supplying stable DC power to aircraft systems, the power factor of an active rectification system becomes increasingly important, as achieving a power factor relatively close to 1 and at the same time lowering the input current harmonics may provide a near optimized system with regard to weight and efficiency.

BRIEF SUMMARY

According to one aspect of the invention, an active rectification system includes an active rectifier, a pulse width modulation (PWM) control, and a closed loop vector control. The PWM control portion is configured to control switching of the active rectifier and the closed loop vector control is configured to generate the required duty cycles for the PWM signals that regulate the DC voltage output and force a three-phase current input of the active rectifier to align with a pole voltage input of the active rectifier.

According to another aspect of the invention, a method of active rectification control of an active rectifier includes detecting a phase angle and a frequency of a voltage input of the active rectifier; regulating a DC output voltage of the active rectifier with d-q components of a pole voltage; and aligning a reference current input of the active rectifier to the d-q components of the pole voltage.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of systems and methods of three-level active rectification PWM control are described in detail below.

Figure 1:
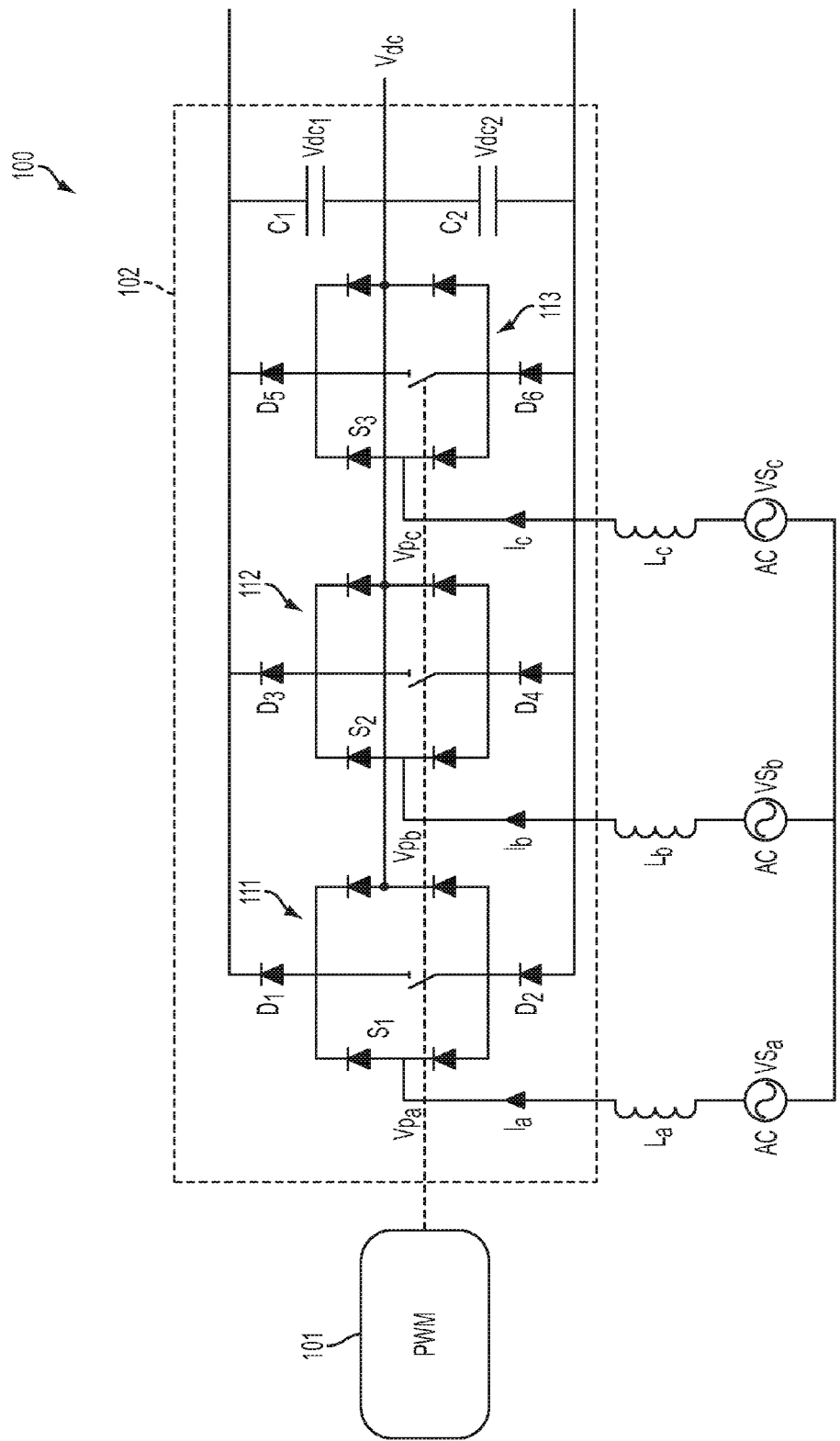
FIG. 1 illustrates an active rectification system, according to an example embodiment.

FIG. 1 illustrates a three-phase three-level switching active rectification system, according to an example embodiment, where Vsa, Vsb, Vsc represent a source input three-phase voltage, and Vpa, Vpb, Vpc represent a three-phase pole voltage. The system 100 may include a PWM control portion 101. The PWM control portion 101 may be a computer processor or processing apparatus configured and disposed to control using a gate-drive circuitry an active rectifier 102 of the system 100. For example, the system 100 includes active rectifier 102 in communication with the PWM control portion 101. As illustrated, the active rectifier 102 is a three-phase three-level switching rectifier that may be realized using a VIENNA rectifier. However, it should be understood that example embodiments are not limited to the illustrated topology of the VIENNA rectifier 102 as any other VIENNA rectifier topology as well as any suitable three-phase three-level active rectifier may be used according to any desired implementation.

The active rectifier 102 may include at least three switches $S_1$, $S_2$, and $S_3$. Each of the switches $S_1$, $S_2$, and $S_3$ is surrounded by balanced diode bridges 111, 112, and 113, respectfully. The first diode bridge 111 may be coupled between a first diode $D_1$ and a second diode $D_2$. The second diode bridge 112 may be coupled between a third diode $D_3$ and a fourth diode $D_4$. The third diode bridge may be coupled between a fifth diode $D_5$ and a sixth diode $D_6$. Further, each of the three switches $S_1$, $S_2$, and $S_3$ may be configured to switch between at least two states. The at least two states may include an open state, and a closed state. The open and closed states, as controlled using PWM 101, realize three-level switching and active rectification using two level switches with two states.

The active rectifier 102 may further include a first capacitance $C_1$ coupled across each of the first, third, and fifth diodes $D_1$, $D_3$, and $D_5$, and a center point of each diode bridge 111, 112, and 113, respectfully. The active rectifier 102 may further include a second capacitance $C_2$ coupled across each of the second, fourth, and fifth diodes $D_2$, $D_4$, and $D_6$, and a center point of each diode bridge 111, 112, and 113, respectfully. Although not illustrated, the system 100 can include a load and/or load resistance $R_L$, coupled in parallel across both the first and second capacitances of active rectifier 102.

As illustrated, the PWM control portion 101 is in electrical communication with each of the switches $S_1$, $S_2$, and $S_3$. During operation, the PWM control portion 101 may direct each of the switches $S_1$, $S_2$, and $S_3$ to change between one of the open and closed states available to the switches $S_1$, $S_2$, and $S_3$, based upon a PWM control scheme as described herein.

As further illustrated, the system 100 may further include boost inductors $L_a$, $L_b$, and $L_c$; each corresponding to a single phase of three-phase AC input current/power source ($V_{sa}$, $V_{sb}$, and $V_{sc}$).

As described above, it may be desirable to provide control methodologies which aim at lowering the input current harmonics and promoting a power factor close to 1 in active rectification systems such as the system 100.

Figure 2:
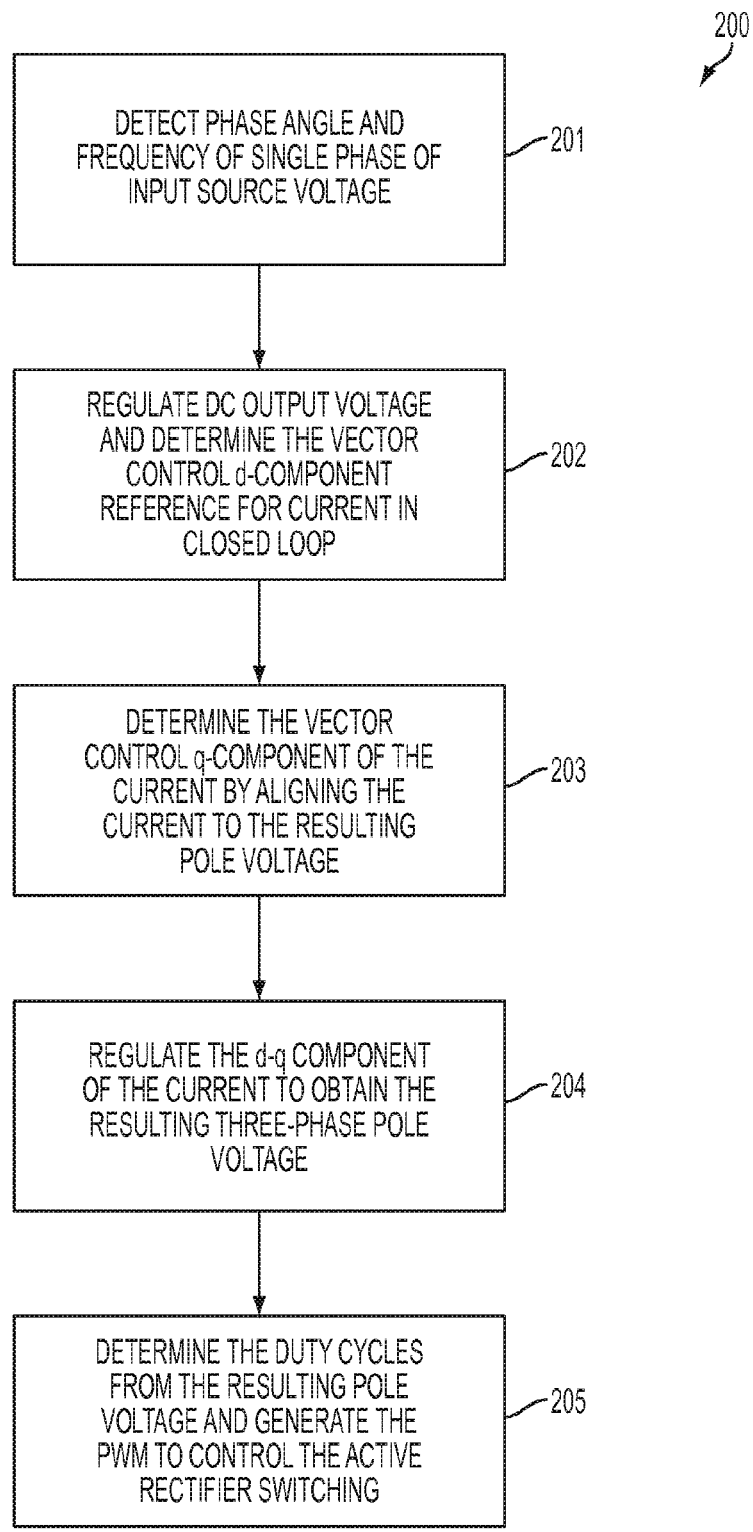
FIG. 2 illustrates a method of active rectification control, according to an example embodiment.
Figure 3:
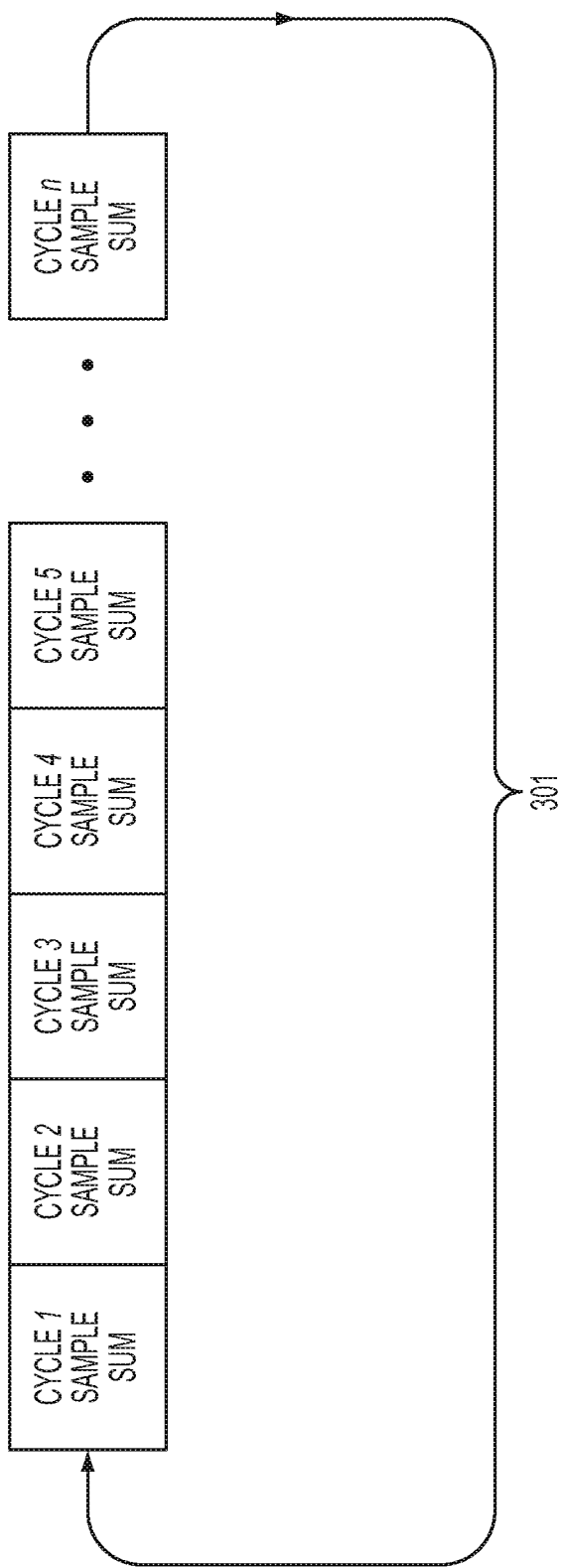
FIG. 3 illustrates a circular buffer for phase and frequency detection, according to an example embodiment.

FIG. 2 illustrates a method of active rectification control, according to an example embodiment. The method 200 may be embodied as computer executable instructions that, when executed by any suitable computer processor, direct the computer processor to perform the method 200. The method 200 may include detecting a phase angle and frequency of a single phase input to an active rectifier at block 201. For example, the detection may be facilitated through a circular buffer 301 as illustrated in FIG. 3.

Thus, through storage of a sequence of events across the circular buffer, the phase angle and frequency may be detected. For example, zero-crossing events may be monitored.

A negative-to-positive zero-crossing event may be detected if all the following conditions are met. The first condition is a condition where the previous phase voltage sample value is negative or equal to zero. The second condition is a condition where the multiplication of the previous phase voltage sample value and the current phase voltage sample value is negative or equal to zero. Finally, third condition is a condition where the last m previous phase voltage sample values are all negative, and where m in one example can be set to any number between 3 to 6.

Upon occurrence of a zero-crossing event, the number of samples between every two consecutive zero-cross events (oneCycleSampSum) is stored in a circular buffer (e.g., 301) of size n at entry i after updating the total sum of all n cycle sample sums (SSum) using equations 1 and 2, set forth below:

$$SSum = SSum - buffer(i) + oneCycleSampSum \quad \text{Equation 1}$$

$$buffer(i) = oneCycleSampSum \quad \text{Equation 2}$$

Where buffer(i) is the ith entry of the circular buffer.

The buffer may be reset (i.e., set i=1) if i is above a predetermined or desired size n. Using the sample sum calculated above, the frequency and initial phase may be calculated based on Equations 3, 4, and 5 below:

$$f = \frac{n * switchRate}{SSum} \quad \text{Equation 3}$$

Where switchRate is the active rectifier PWM switching rate in Hz.

$$\Delta\theta = \frac{2n\pi}{SSum} \quad \text{Equation 4}$$

Where $\Delta\theta$ is amount of phase angle difference between two consecutive samples.

Initial Phase $\theta_{init}$ is calculated using equation 5:

$$\theta_{init} = \frac{currV}{currV - prevV} * \Delta\theta \quad \text{Equation 5}$$

Where prevV is the previous phase voltage sample value and currV is the current phase voltage sample value.

The phase angle $\theta$ is then set to be the initial phase using equation 6:

$$\theta = \theta_{init} \quad \text{Equation 6}$$

Furthermore, $\theta_{old}$ is set to $\theta$ using equation 7:

$$\theta_{old} = \theta \quad \text{Equation 7}$$

Thereafter, at every new sample taken between two zero-crossing events, a new phase angle may be calculated using Equation 8 below, where after $\theta_{old}$ is set to $\theta$ using equation 8:

$$\theta = \theta_{old} + \Delta\theta \quad \text{Equation 8}$$

Thus, as described above, detection of the phase angle and frequency may be facilitated through a circular buffer 301, through monitoring of zero-crossing events of a single phase of an input to an active rectifier. As noted above in Equation 6, the initial phase angle, however, is calculated using one of the input phase voltages (for example it can be calculated using phase A of the input voltage without introducing any phase adjustment). Thereafter, phase angle calculation does not depend on an input source voltage between two zero-crossing events, but is calculated as an accumulation of J0 to the initial detected phase until a new zero cross event is detected.

It should be noted that false detections of zero-crossing events may become an issue if an input voltage is relatively noisy. However, a threshold may be used to limit this error. For example, a detected zero-crossing event may be neglected if the accumulated sum of sample is less than this threshold.

Furthermore, the initial frequency may be calculated upon filling of the n-entry circular buffer 301. Upon initial calculation, further changes to frequency may be calculated through monitoring zero-crossing events as described above and at every new zero-cross event.

Turning back to FIG. 2, the method 200 further includes regulating DC output voltage and determining the d-component reference for the d-component current for a vector control algorithm in a closed loop. For example, the vector control methodology including the closed loop is illustrated in FIG. 4.

Figure 4:
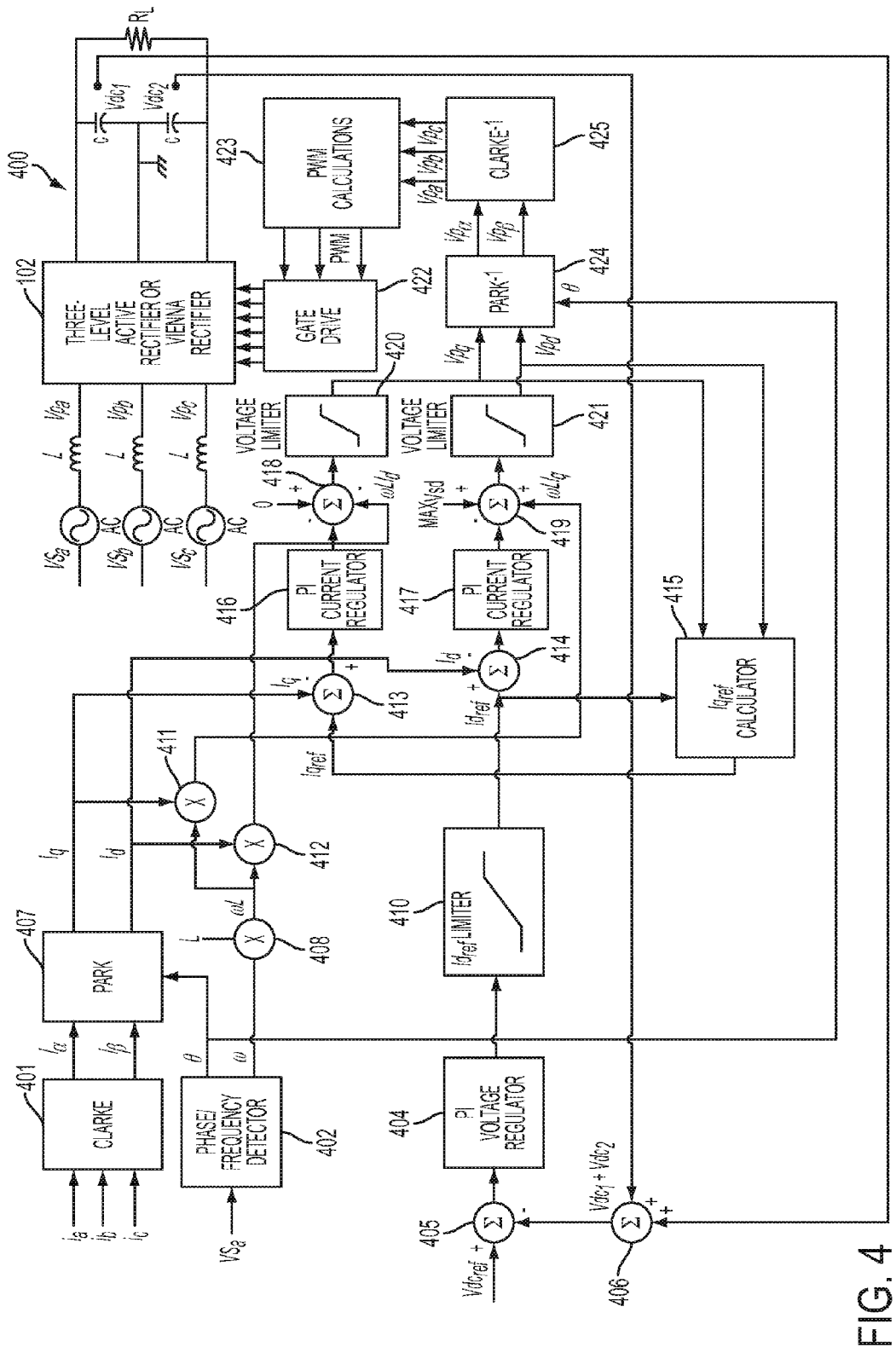
FIG. 4 illustrates a vector control methodology, according to an example embodiment.

FIG. 4 illustrates a vector control methodology, according to an example embodiment. The vector control methodology may be implemented as computer executable instructions that, when executed on any suitable processor, direct the processor to perform and execute the methodology 400 as described below.

According to the methodology 400, the three phase current input and voltage input as well as the two capacitor voltage output to an active rectifier may be monitored continuously. At block 406 the two output DC capacitor voltages are summed. The resulting sum is subtracted from the desired output DC voltage at block 405. The resulting difference is then processed through a proportional and integral control at block 404 and then limited at block 410. The output of block 410 is the d-component reference of the current (e.g., block 202 of method 200 in FIG. 2).

Block 402 of FIG. 4 is the phase and frequency detector described herein-before. Phase A of the input 3-phase voltage is used here to detect the phase angle and frequency of the input voltage. The outputs of block 402 are the phase angle $\theta$ and the angular frequency $\omega = 2\pi f$, where f is the detected frequency in Hz.

At block 401 the current three-phase inputs of an active rectifier are transformed using Clarke transformations. One example of a Clarke transformation is depicted in Equations 9 and 10, below. However, it should be noted that any suitable implementation including different equations may also be applicable.

$$i_\alpha = i_a \quad \text{Equation 9}$$

$$i_\beta = \frac{1}{\sqrt{3}} i_a + \frac{2}{\sqrt{3}} i_b \quad \text{Equation 10}$$

Subsequently, the outputs of the Clarke transformations are input to block 407, where the Clarke outputs are transformed into a d-q frame through Park transformations using the detected phase angle $\theta$. One example of a Park transformation is depicted in Equations 11 and 12, below. However, it should be noted that any suitable implementation including different equations may also be applicable.

$$i_d = \cos(\theta) \cdot i_\alpha + \sin(\theta) \cdot i_\beta \quad \text{Equation 11}$$

$$i_q = \sin(\theta) \cdot i_\alpha + \cos(\theta) \cdot i_\beta \quad \text{Equation 12}$$

The angular frequency ω is multiplied by the single phase boost inductance L at block 408. The resulting ωL is then multiplied by the d-q components of the current at blocks 411 and 412. Thereafter, d-q current components of the measured current are subtracted from the d-q reference component of the current at blocks 413 and 414. Proportional and integral (PI) control of the difference outputs at blocks 413 and 414 is performed at blocks 416 and 417. One example of a suitable proportional Laplace transform for blocks 416 and 417 is depicted in Equation 13, below:

$$K_p + \frac{K_i}{s} \quad \text{Equation 13}$$

In Equation 13, $K_p$ is proportional gain and $K_i$ is integral gain.

Block 418 subtracts the output of block 416 and the multiplication of ωL and $I_d$ performed at block 412 from zero (which is the expected q-component of the input voltage). Block 419 subtracts the output of block 417, adds the multiplication of ωL and $I_q$ performed at block 411, and adds the maximum expected value of the d-component of the input voltage ($Max_{Vsd}$). The outputs of blocks 418 and 419 are then limited using voltage limiters 420 and 421. The outputs of blocks 420 and 421 are the d-q components of the resulting pole voltage. The d-q components of the resulting pole voltage are then transformed at blocks 424 and 425 using an inverse Park transformation, inverse Clark transformation, and the phase angle θ or a modified θ that includes delays due to hardware implementation artifacts of the control algorithm to the 3-phase components of the resulting pole voltage.

One example of an inverse Park transformation is depicted in Equations 14 and 15, below. However, it should be noted that any suitable implementation including different equations may also be applicable.

$$Vp_\alpha = \cos(\theta) \cdot Vp_d - \sin(\theta) \cdot Vp_q \quad \text{Equation 14}$$

$$Vp_\beta = \sin(\theta) \cdot Vp_d + \cos(\theta) \cdot Vp_q \quad \text{Equation 15}$$

One example of an inverse Clarke transformation is depicted in Equations 16, 17, and 18, below. However, it should be noted that any suitable implementation including different equations may also be applicable.

$$Vp_a = Vp_\alpha \quad \text{Equation 16}$$

$$Vp_b = -\frac{1}{2}Vp_\alpha + \frac{\sqrt{3}}{2}Vp_\beta \quad \text{Equation 17}$$

$$Vp_c = -\frac{1}{2}Vp_\alpha - \frac{\sqrt{3}}{2}Vp_\beta \quad \text{Equation 18}$$

The d-q components of the resulting pole voltage (outputs of blocks 420 and 421) along with the calculated reference d-component of the current (output of block 410) are used in block 415 to calculate the reference q-component of the current that is referred to as step 203 of method 200 in FIG. 2. Block 415 performs a phase alignment of the input current to the resulting pole voltage of the active rectifier. This is done by calculating the q-component current reference such that the input current and the pole voltage are in phase alignment. The calculated q-component current reference is to be used as a reference during the subsequent control loop processing (i.e., the following instance the control loop is processed).

Figure 5:
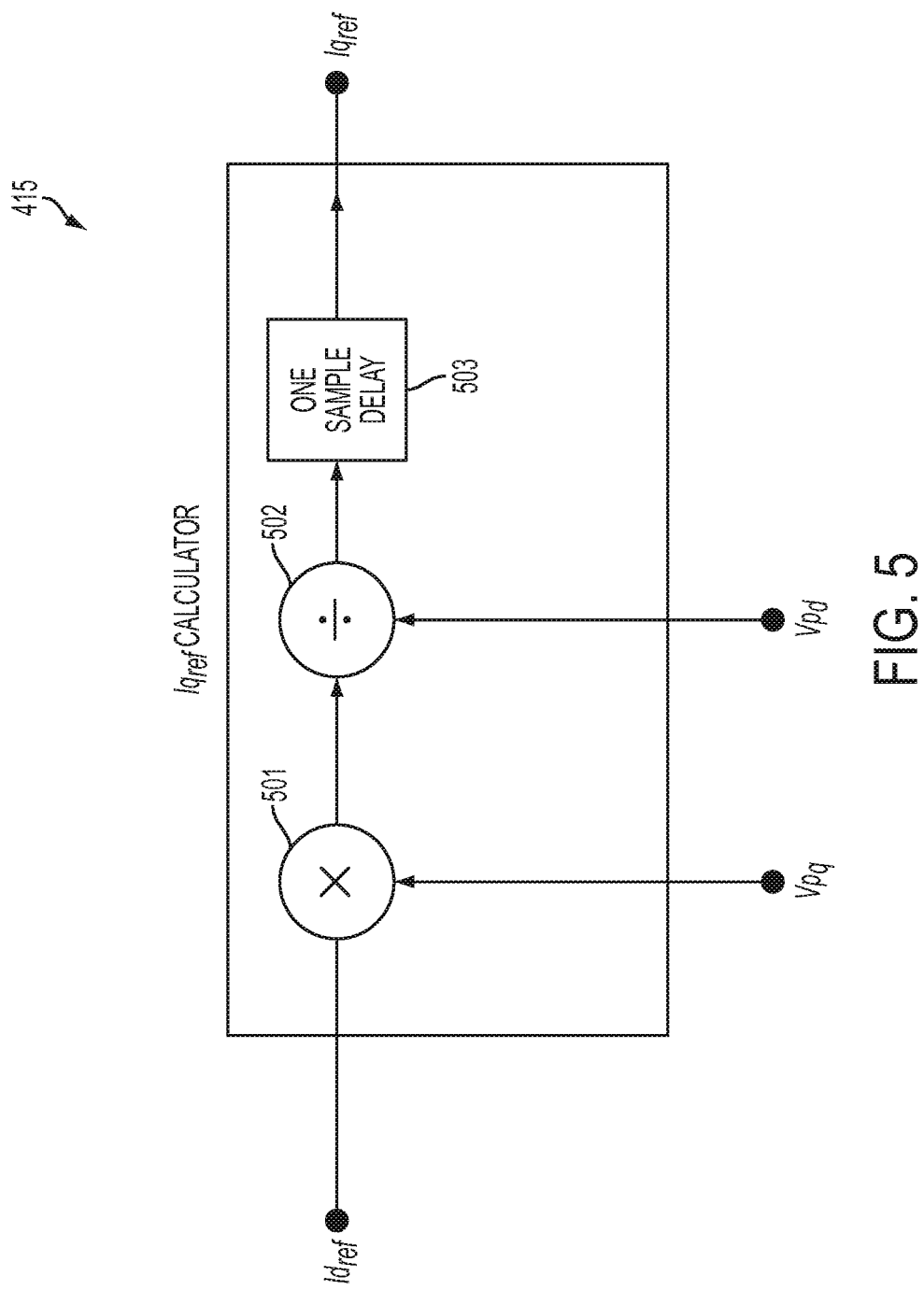
FIG. 5 illustrates a reference current calculation methodology, according to an example embodiment.

FIG. 5 illustrates the q-component reference current calculation methodology, according to an example embodiment. As illustrated, the q-component reference current is calculated using Equation 19, below:

$$Iqref = \frac{Idref \times Vpq}{Vpd} \quad \text{Equation 19}$$

Where $V_{pq}$ and $V_{pd}$ are the d-q components of the pole voltage (outputs of blocks 420 and 421) and $I_{dref}$ is the calculated d-component reference of the current (output of block 410).

The one sample delay block 503 delays the calculated $I_{qref}$ such that it is used the next time the control loop calculations are processed. Hence, $I_{qref}$ is not set to zero. It is set to a non-zero value such that a phase alignment between the current and the pole voltage is achieved.

Thus, an outer, closed vector control loop is formed through blocks 404, 405, 406, 410, 415, 424, 425, and 423.

An inner loop is formed through blocks 401, 407, 408, 411, 412, 413, 414, 416, 417, 418, 419 420, and 421.

Through the monitoring and calculations determined through the closed outer loop and the inner loop, PWM for an active rectifier may be calculated. Outputs from the active rectifier may be monitored through the closed outer loop as described above and used to alter the PWM for the active rectifier, thereby forming the closed-vector control methodology 400.

Turning back to FIG. 2, the method 200 includes regulating the d-q component of the current to obtain a resulting three-phase pole voltage at block 204. Alignment of the current to the pole voltage through regulation forms the reference current described above in methodology 400. Thus, blocks 202-204 of the method 200 are regulating DC voltage output from an active rectifier and aligning the input currents to the pole voltage of the active rectifier through the closed loop of the vector control methodology 400.

The method 200 further includes determining the duty cycles from the resulting pole voltage (see 204) and generating appropriate PWM to control the active rectifier 102. Block 205 of method 200 in FIG. 2 is performed by block 423 of the vector control method 400 in FIG. 4. The resulting PWM is processed by the gate drive circuitry at block 422 which controls the switching of the active rectifier 102 (e.g., a VIENNA rectifier).

As described above, example embodiments provide methods of active rectifier control using a closed vector control loop to determine a non-zero reference current which aligns three-phase current input of an active rectifier to pole voltage input of the active rectifier. Through alignment of the current to pole voltage, the power factor of an active rectification system using the closed loop, active rectifier, and a power source obtains a power factor close to 1 and at the same time lowers the harmonics of the input current to an acceptable level. In other words, it improves the quality of the input current while achieving a power factor close to a 1.

Figure 6:
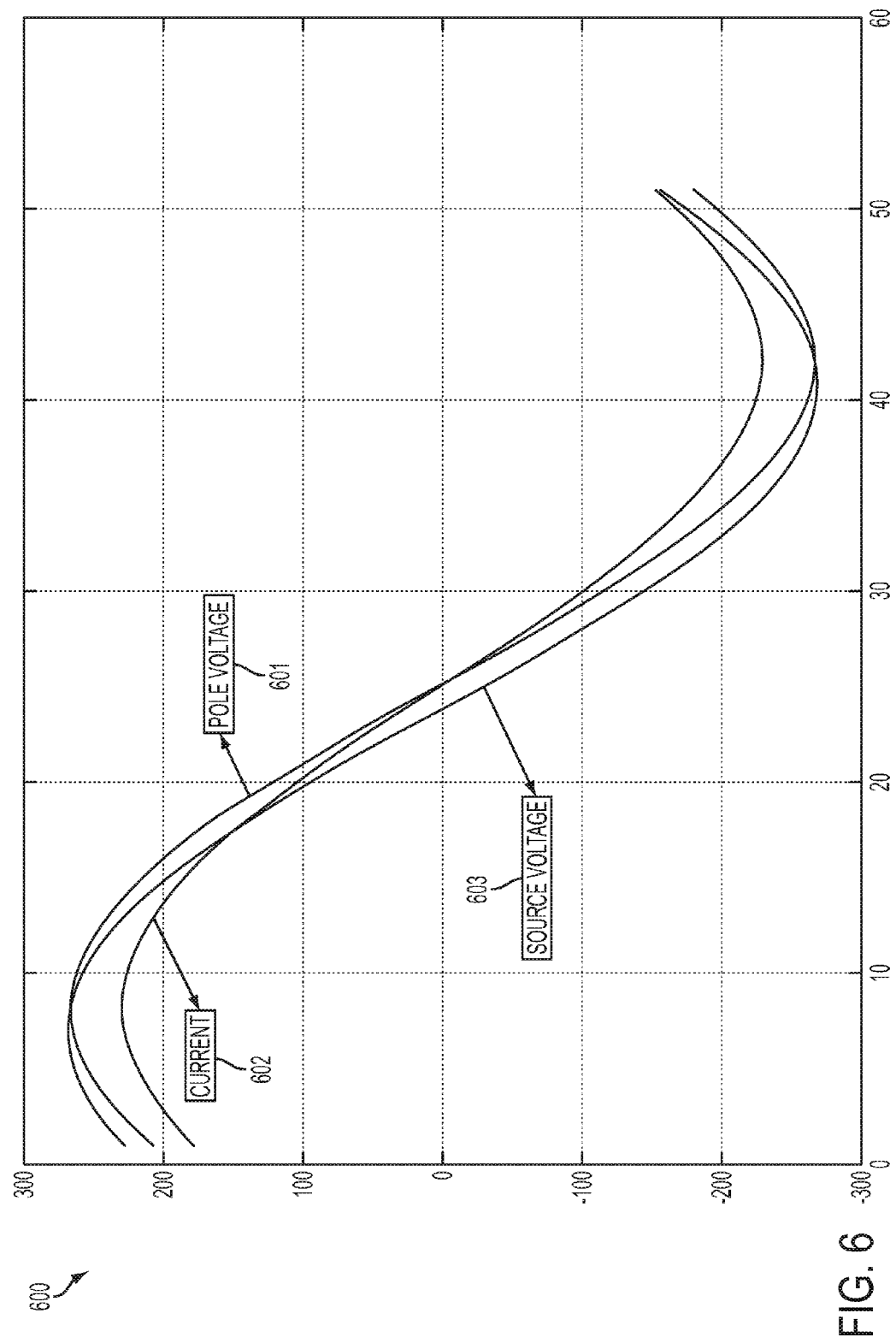
FIG. 6 illustrates a graph of input current versus pole voltage and source voltage, in response to application of a vector control methodology.

FIG. 6 illustrates a graph of input current versus pole voltage, in response to application of a vector control methodology which regulates DC output of an active rectifier while aligning three-phase current input to the pole voltage of the active rectifier. As illustrated, the current waveform 602 is in alignment with the pole voltage waveform 601, with the source voltage waveform denoted as 603.

As provided and described in detail above, example embodiments of the present invention provide beneficial increases in the power factor of an active rectification system through regulated DC voltage output of an active rectifier using a closed loop. Aligning a three-phase current input of the active rectifier to the pole voltage of the active rectifier improves the input current harmonics of the active rectifier. This is beneficial for some applications that require lower current harmonics active rectification systems.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of active rectification control of an active rectifier, comprising:
    detecting a phase angle and a frequency of a voltage input of the active rectifier;
    regulating a DC output voltage of the active rectifier with d-q components of a pole voltage; and
    aligning a reference current input of the active rectifier to the d-q components of the pole voltage.

2. The method of claim 1, wherein the detecting of the phase angle and the frequency includes monitoring zero-crossing events of the voltage input.

3. The method of claim 2, wherein the monitoring of the zero-crossing events includes determining if a zero-crossing event has occurred and adding the zero-crossing event to a circular buffer of previous zero-crossing events.

4. The method of claim 1, wherein the detecting of the phase angle of the voltage input includes adding a phase-change value to a previous phase angle value.

5. The method of claim 1, wherein the regulating of the DC output voltage of the active rectifier with d-q components of the voltage input includes calculating a Clarke transformation of the voltage inputs based on the phase angle to determine the d-q components of the pole voltage.

6. The method of claim 1, wherein the aligning of the reference current input includes determining a non-zero reference current based on the d-q components of the pole voltage.

7. The method of claim 1, wherein the regulating of the DC output voltage of the active rectifier with d-q components of the pole voltage includes calculating a Park transformation of the voltage input based on the frequency to determine the d-q components of the pole voltage.

8. The method of claim 1, wherein the aligning of the current input includes determining a non-zero reference current based on the d-q components of the pole voltage.

9. The method of claim 1, further comprising determining a q-component reference current that causes the reference current input to align with the d-q components of the pole voltage.

10. The method of claim 9, further comprising determining the q-component reference current as a function of a d-component reference current and the d-q components of the pole voltage.

11. The method of claim 1, further comprising controlling switching of the active rectifier with a pulse width modulation (PWM) control portion.

* * * * *